US008945684B2

(12) United States Patent
Fournand

(10) Patent No.: US 8,945,684 B2
(45) Date of Patent: Feb. 3, 2015

(54) PROCESS FOR COATING AN ARTICLE WITH AN ANTI-FOULING SURFACE COATING BY VACUUM EVAPORATION

(75) Inventor: Gérald Fournand, Tampa, FL (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 1733 days.

(21) Appl. No.: 11/267,954

(22) Filed: Nov. 4, 2005

(65) Prior Publication Data

US 2007/0104891 A1 May 10, 2007

(51) Int. Cl.
| B05D 5/06 | (2006.01) |
| B05D 5/08 | (2006.01) |
| B05D 3/06 | (2006.01) |
| C23C 14/02 | (2006.01) |
| C23C 14/12 | (2006.01) |
| C23C 14/24 | (2006.01) |
| C23C 14/26 | (2006.01) |
| C23C 14/28 | (2006.01) |
| C23C 14/30 | (2006.01) |
| G02B 27/00 | (2006.01) |
| C09D 5/16 | (2006.01) |
| G02B 1/10 | (2006.01) |
| G02B 1/12 | (2006.01) |

(52) U.S. Cl.
CPC .......... *G02B 27/0006* (2013.01); *C09D 5/1662* (2013.01); *G02B 1/105* (2013.01); *G02B 1/12* (2013.01)
USPC ........... 427/535; 427/488; 427/490; 427/491; 427/534; 427/489; 427/536; 427/539; 427/540; 427/566; 427/164; 427/562; 427/563; 427/167; 427/166; 427/255.6; 427/591; 427/593; 427/568

(58) Field of Classification Search
None
See application file for complete search history.

(56) References Cited

U.S. PATENT DOCUMENTS

| 3,645,771 | A | * | 2/1972 | Ward ............................. 427/10 |
| 4,024,291 | A | * | 5/1977 | Wilmanns ...................... 427/10 |
| 4,048,349 | A | * | 9/1977 | White et al. .................... 427/58 |
| 4,058,638 | A | * | 11/1977 | Morton ......................... 427/573 |
| 4,211,823 | A | | 7/1980 | Suzuki et al. ................. 428/412 |
| 4,260,466 | A | * | 4/1981 | Shirahata et al. .......... 204/192.2 |
| 4,390,601 | A | * | 6/1983 | Ono et al. ..................... 428/412 |
| 4,410,563 | A | | 10/1983 | Richter et al. ................ 427/108 |
| 4,859,493 | A | * | 8/1989 | Lemelson .................... 427/562 |
| 4,999,215 | A | * | 3/1991 | Akagi et al. ................. 427/488 |
| 5,015,523 | A | | 5/1991 | Kawashima et al. ......... 428/336 |
| 5,260,093 | A | * | 11/1993 | Kamel et al. ................ 427/2.25 |
| 5,316,791 | A | | 5/1994 | Farber et al. ................. 427/164 |
| 6,183,872 | B1 | | 2/2001 | Tanaka et al. ................ 428/429 |
| 6,207,238 | B1 | * | 3/2001 | Affinito ....................... 427/488 |
| 6,214,422 | B1 | * | 4/2001 | Yializis ....................... 427/488 |
| 6,245,150 | B1 | * | 6/2001 | Lyons et al. ................. 118/726 |
| 6,258,407 | B1 | * | 7/2001 | Lee et al. ................. 427/255.28 |
| 6,277,485 | B1 | | 8/2001 | Invie et al. ................... 428/336 |
| 6,331,330 | B1 | * | 12/2001 | Choy et al. ................... 427/475 |
| 6,503,564 | B1 | * | 1/2003 | Fleming et al. ............ 427/255.6 |
| 6,503,631 | B1 | | 1/2003 | Faverolle et al. ............ 428/447 |
| 6,610,368 | B2 | * | 8/2003 | Schmitz et al. .............. 427/447 |
| 6,770,352 | B2 | * | 8/2004 | Suzuki et al. ................ 428/142 |
| 6,800,336 | B1 | * | 10/2004 | Fornsel et al. ............... 427/562 |
| 7,217,440 | B2 | * | 5/2007 | Jallouli et al. ............... 427/162 |
| 7,517,561 | B2 | * | 4/2009 | Haack et al. ................. 427/447 |
| 7,678,429 | B2 | * | 3/2010 | Goodwin et al. ............ 427/569 |
| 8,082,756 | B2 | * | 12/2011 | Conte et al. .................. 65/60.3 |
| 8,709,588 | B2 | * | 4/2014 | Cadet et al. ............... 428/304.4 |
| 8,817,376 | B2 | * | 8/2014 | Lee et al. ..................... 359/588 |
| 2003/0139620 | A1 | * | 7/2003 | Yamaguchi et al. ......... 556/445 |
| 2004/0253369 | A1 | * | 12/2004 | Jallouli et al. ............... 427/162 |
| 2006/0139754 | A1 | * | 6/2006 | Bacon et al. ................. 359/530 |
| 2008/0044561 | A1 | * | 2/2008 | De Leuze-Jallouli et al. ........... 427/180 |
| 2010/0048076 | A1 | * | 2/2010 | Creyghton et al. .......... 442/135 |
| 2014/0016201 | A1 | * | 1/2014 | Lee et al. ..................... 359/580 |
| 2014/0057051 | A1 | * | 2/2014 | Kato et al. ................ 427/255.6 |

FOREIGN PATENT DOCUMENTS

| EP | 0203730 | 12/1986 |
| EP | 0404111 | 12/1990 |
| EP | 0749021 | 12/1996 |

(Continued)

OTHER PUBLICATIONS

Machine translation of JP 2000-308846 by Ihashi Noritaka et al., published in Nov. 2000.*
S. Sivaram, Chemical Vapor Deposition, Thermal and Plasma Deposition of Electronic Materials; VanNostrand Reinhold, New York; 1995 (no month); excerpt pp. 119-123.*
Owens, et al., "Estimation of the surface force energy of polymers," *J. Appl. Polym. Sci* 1741-1747, 1969.

*Primary Examiner* — Marianne L Padgett
(74) *Attorney, Agent, or Firm* — Fulbright & Jaworski LLP

(57) ABSTRACT

The invention relates to a process for depositing an anti-fouling top coat onto the outermost coating layer of a coated optical article, comprising the following steps:

a) providing an optical article having two main faces, at least one of which being coated with an outermost layer;

b) treating said outermost layer with energetic species resulting in surface physical attack and/or chemical modification; and c) vacuum evaporating a liquid coating material for an anti-fouling top coat by means of an evaporation device, resulting in the deposition of the evaporated coating material onto the treated outermost layer of the optical article, wherein prior to the vacuum evaporation step of the liquid coating material, said liquid coating material has been treated with energetic species.

38 Claims, No Drawings

(56) References Cited

FOREIGN PATENT DOCUMENTS

| EP | 0614957 | 9/1997 |
| EP | 0844265 | 5/1998 |
| EP | 0933377 | 8/1999 |
| JP | 63-087223 | 4/1988 |
| JP | 63-141001 | 6/1988 |
| JP | 2000-308846 | 11/2000 |
| WO | WO 94/10230 | 5/1994 |

* cited by examiner

PROCESS FOR COATING AN ARTICLE WITH AN ANTI-FOULING SURFACE COATING BY VACUUM EVAPORATION

BACKGROUND OF THE INVENTION

1. Field of the Invention

The present invention relates in a general manner to a process for depositing an anti-fouling top coat, especially a fluorinated hydrophobic and/or oleophobic coating, onto the external surface of an optical article by vacuum evaporation, in particular onto the abrasion- and/or scratch-resistant coating or the anti-reflection coating of an ophthalmic lens. The process involves energetic treatments of the optical article and the material to be coated before deposition of the top coat and is particularly valuable when performed under moderate vacuum.

2. Description of Related Art

It is a common practice in the art to coat at least one main surface of a lens substrate, such as an ophthalmic lens or lens blank, with several coatings for imparting to the finished lens additional or improved optical or mechanical properties. These coatings are designated in general as functional coatings.

Thus, it is usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat), an anti-reflection coating and, optionally, an anti-fouling top coat. Other coatings such as a polarized coating, a photochromic or a dyeing coating may also be applied onto one or both surfaces of the lens substrate.

The last generation ophthalmic lenses most often comprise such external layer of anti-fouling material deposited on the anti-reflection coating, in particular an anti-reflection coating made of an inorganic material, so as to reduce their strong tendency to staining. Such an anti-fouling top coat is generally a hydrophobic and/or oleophobic coating, which reduces the surface energy so as to avoid the adhesion of fatty deposits, such as fingerprints, sebum, sweat, cosmetics, which are thus easier to remove.

Such top coats are well known in the art and are usually made of fluorosilanes or fluorosilazanes i.e., silicones or silazanes bearing fluorine-containing groups. Examples of classical materials for top coats are OPTOOL DSX, which is a fluorine-based resin comprising perfluoropropylene moieties, commercialized by Daikin Industries, KY130 from Shin-Etsu Chemical and KP 801M, also commercialized by Shin-Etsu Chemical. These coatings generally impart to the lens a contact angle with water of at least 95°.

The deposition techniques for such anti-fouling top coats are very diverse, including liquid phase deposition such as dip coating, spin coating (centrifugation), spray coating, or vapor phase deposition (vacuum evaporation). Of which, deposition by evaporation under vacuum is one of the most commonly used techniques.

Japanese Patent Application published under No JP 2000-308846 (Toppan Printing Co. Ltd) discloses a method for formation of an anti-fouling layer on an optical article, comprising the step of pre-treating the surface of the optical article before deposition of the anti-fouling coating by classical methods. As a pre-treatment step, a high-frequency discharge plasma method, a glow discharge plasma method, a corona treatment, an electron beam method, an ion beam method, an acid or base treatment can be employed. The anti-fouling layer is deposited by vacuum evaporation upon heating a coating solution under a pressure of less than 1 Pa, generally less than $10^{-3}$ Pa. In the examples, surface pre-treatment was achieved with a plasma under a pressure ranging from $10^{-3}$ to $10^{-1}$ Pa.

This method is suitable for numerous applications. However, such low pressures cannot be attained by all vacuum chambers for technical reasons, which may not allow a satisfactory anti-fouling top coat deposition due to adhesion problems. Indeed, the present inventors have found that the above method is fully inefficient if it is performed in a vacuum chamber under a pressure equal to or higher than 10 Pa, which is described in more detail in the examples given at the end of the specification.

SUMMARY OF THE INVENTION

The present invention has been made in view of the above problems, and it is an object of the present invention to provide a process for depositing an anti-fouling surface coating onto the outermost layer of an optical article without encountering adhesion troubles, even if the whole process is conducted under a moderate vacuum. By "under a moderate vacuum", it is intended to mean under a pressure of at least 10 Pa.

According to the invention, it was found that it is necessary to perform a treatment with energetic species of both the outermost layer of the optical article and the coating material for the anti-fouling top coat before deposition of the latter, in order to obtain a good adhesion at the interface between the outermost layer of the optical article and the anti-fouling top coat.

To achieve the foregoing objects, and in accordance with the invention as embodied and broadly described herein, the present invention relates to a process for depositing an anti-fouling top coat onto the outermost coating layer of a coated optical article, comprising the following steps:

a) providing an optical article having two main faces, at least one of which being coated with an outermost layer;

b) treating said outermost layer with energetic species resulting in surface physical attack and/or chemical modification; and c) vacuum evaporating a liquid coating material for an anti-fouling top coat by means of an evaporation device, resulting in the deposition of the evaporated coating material onto the treated outermost layer of the optical article, wherein prior to the vacuum evaporation step of the liquid coating material, said liquid coating material has been treated with energetic species.

The embodiment is further drawn to a deposition process, in which said liquid coating material and said outermost layer of the optical article simultaneously undergo the same treatment with energetic species.

In preferred embodiments, the energetic treatment is a plasma treatment and the evaporation device comprises an electrical circuit connected to a piece of steel wool onto which the liquid coating material for the anti-fouling top coat is deposited.

Other objects, features and advantages of the present invention will become apparent from this description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a method, or a step in a method, that "comprises," "has," "contains," or "includes" one or more steps or elements possesses those one or more steps or elements, but is not limited to possessing only those one or more steps or elements.

The optical articles used in the process of the invention are preferably ophthalmic lenses. Herein, the term "lens" means an organic or inorganic glass lens, comprising a lens substrate which may be coated with one or more coatings of various natures.

When the optical article comprises one or more surface coatings, the term "to deposit a layer onto the optical article" means that a layer is deposited onto the outermost coating of the optical article.

By outermost layer or coating of a coated optical article, it is meant herein the external coating layer or coating of the optical article at a coating stage, in which an anti-fouling coating has still not been deposited. Herein, the outermost layer or coating is the layer or coating onto which an anti-fouling top coat is deposited according to the process of the invention. Said outermost layer or coating of the optical article is generally a mono- or multilayered anti-reflection coating or an abrasion- and/or scratch-resistant coating (hard coat), preferably an abrasion- and/or scratch-resistant coating (hard coat).

According to the invention, there is provided a process for depositing an anti-fouling top coat onto the outermost coating layer of a coated optical article, preferably an ophthalmic lens, by vacuum evaporation of a coating material, preferably liquid, which involves the steps of treating said outermost layer with energetic species, but also said liquid coating material prior to the vacuum evaporation step.

Although the lens substrate can be made of mineral glass or organic glass, it is preferably made of organic glass. The organic glasses can be either thermoplastic materials such as polycarbonates and thermoplastic polyurethanes or thermosetting (cross-linked) materials such as diethylene glycol bis (allylcarbonate) polymers and copolymers (in particular CR 39® from PPG Industries), thermosetting polyurethanes, polythiourethanes, polyepoxides, polyepisulfides, poly (meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates and diethylene glycol bis(allylcarbonate) copolymers, in particular substrates made of polycarbonate.

The coated optical article which outermost layer is coated with the process of the invention may comprise usual functional coatings, such as one or more coatings selected from: an anti-reflection coating (AR coating), an anti-abrasion- and/or scratch-resistant coating, an impact-resistant coating, a polarized coating, a photochromic coating, a dyed coating.

Preferably, functional coatings used in the present invention are selected from the group consisting of an impact-resistant coating, an abrasion- and/or scratch-resistant coating and an anti-reflection coating. Most preferably, the optical article used herein is coated with the latter coatings in the order they are cited, starting from the surface of the optical article.

The impact-resistant primer coating can be any coating typically used for improving impact resistance of a finished optical article. Also, this coating generally enhances adhesion of the scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings. (Meth)acrylic based impact-resistant coatings are, among others, disclosed in U.S. Pat. Nos. 5,015,523 and 6,503,631 whereas thermoplastic and cross-linked based polyurethane resin coatings are disclosed inter alia, in Japanese Pat. Nos. 63-141001 and 63-87223, EP Pat. No. 0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethylene glycol(meth)acrylate based compositions such as, for example, tetraethylene glycoldiacrylate, polyethylene glycol (200) diacrylate, polyethylene glycol (400) diacrylate, polyethylene glycol (600) di(meth)acrylate, as well as urethane (meth)acrylates and mixtures thereof.

Preferably the impact-resistant primer coating has a glass transition temperature (Tg) of less than 30° C. Among the preferred impact-resistant primer coating compositions, there may be cited the acrylic latex commercialized under the name Acrylic latex A-639 by Zeneca and polyurethane latexes commercialized under the names W-240 and W-234 by Baxenden.

In a preferred embodiment, the impact-resistant primer coating may also include an effective amount of a coupling agent in order to promote adhesion of the primer coating to the optical substrate and/or to the scratch-resistant coating. The same coupling agents, in the same amounts, as for the scratch-resistant coating compositions described below, can be used with the impact-resistant coating compositions.

The impact-resistant primer coating composition can be applied onto the lens substrate using any classical method such as spin, dip, or flow coating.

The impact-resistant primer coating composition can be simply dried or optionally pre-cured before molding of the optical substrate. Depending upon the nature of the impact-resistant primer coating composition, thermal curing, UV-curing or a combination of both can be used.

Thickness of the impact-resistant primer coating, after curing, typically ranges from 0.05 to 30 μm, preferably 0.5 to 20 μm and more particularly from 0.6 to 15 μm, and even better 0.6 to 5 μm.

Any known optical abrasion- and/or scratch-resistant coating composition can be used to form the abrasion- and/or scratch-resistant coating. Thus, the abrasion- and/or scratch-resistant coating composition can be a UV and/or a thermal curable composition.

By definition, an abrasion- and/or scratch-resistant coating is a coating which improves the abrasion- and/or scratch-resistance of the finished optical article as compared to a same optical article but without the abrasion- and/or scratch-resistant coating. Preferred coating compositions are (meth)acrylate based coatings. The term (meth)acrylate means either methacrylate or acrylate.

The main component of the (meth)acrylate based coating compositions may be chosen from monofunctional (meth) acrylates and multifunctional (meth)acrylates such as difunctional (meth)acrylates; trifunctional (meth)acrylates; tetrafunctional (meth)acrylates, pentafunctional(meth) acrylates, hexafunctional (meth)acrylates.

Examples of monomers which may be used as main components of (meth)acrylate based coating compositions are:

Monofunctional (meth)acrylates: Allyl methacrylate, 2-ethoxyethyl acrylate, 2-ethoxyethyl methacrylate, caprolactone acrylate, isobornyl methacrylate, lauryl methacrylate, polypropylene glycol monomethacrylate.

Difunctional (meth)acrylates: 1,4-butanediol diacrylate, 1,6-hexanediol diacrylate, 1,6-hexanediol dimethacrylate, polyethylene glycol diacrylate, tetraethylene glycol diacrylate, polyethylene glycol dimethacrylate, polyethylene glycol diacrylate, ethoxylated bisphenol A diacrylate, tetraethylene glycol diacrylate, tripropylene glycol diacrylate, neopentyl glycol diacrylate, 1,4-butanediol dimethacrylate, tetraethylene glycol dimethacrylate, diethylene glycol diacrylate.

Trifunctional (meth)acrylates: Trimethylolpropane trimethacrylate, Trimethylolpropane triacrylate, pentaerythritol triacrylate, ethoxylated trimethylolpropane triacrylate, trimethylolpropane trimethacrylate.

Tetra to hexa(meth)acrylates: Dipentaerythritol pentaacrylate, pentaerythritol tetraacrylate, ethoxylated pentaerythritol tetraacrylate, pentaacrylate esters.

Other preferred abrasion- and/or scratch-resistant coatings are those made by curing a precursor composition including epoxyalkoxysilanes or a hydrolyzate thereof, optionally colloidal mineral fillers and a curing catalyst. Examples of such compositions are disclosed in U.S. Pat. No. 4,211,823, WO Pat. No. 94/10230, U.S. Pat. No. 5,015,523, EP Pat. No. 614957.

Especially preferred epoxyalkoxysilane based abrasion- and/or scratch-resistant coating compositions are those comprising as the main constituent an epoxyalkoxysilane such as, for example, γ-glycidoxypropyl-trimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions.

In order to improve the adhesion of the abrasion- and/or scratch-resistant coating to the impact-resistant primer coating, an effective amount of at least one coupling agent can be added to the abrasion- and/or scratch-resistant coating composition. The preferred coupling agent is a pre-condensed solution of an epoxyalkoxysilane and an unsaturated alkoxysilane, preferably comprising a terminal ethylenic double bond.

Examples of epoxyalkoxysilanes are GLYMO, γ-glycidoxypropyl-pentamethyldisiloxane, γ-glycidoxypropyl-methyl-diisopropenoxysilane, γ-glycidoxypropyl-methyl-diethoxysilane, γ-glycidoxypropyl-dimethyl-ethoxysilane, γ-glycidoxypropyl-diisopropyl-ethoxysilane and γ-glycidoxypropyl-bis(trimethylsiloxy)methylsilane. The preferred epoxyalkoxysilane is GLYMO.

The unsaturated alkoxysilane can be a vinylsilane, an allylsilane, an acrylic silane or a methacrylic silane.

Examples of vinylsilanes are vinyltris(2-methoxyethoxy) silane, vinyltrisisobutoxysilane, vinyltri-tert-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxysilane, vinylbis(trimethylsiloxy)silane and vinyidimethoxyethoxysilane.

Examples of allylsilanes are allyltrimethoxysilane, alkyltriethoxysilane and allyltris(trimethylsiloxy)silane.

Examples of acrylic silanes are 3-acryloxypropyltris(trimethylsiloxy) silane, 3-acryloxy-propyl-trimethoxysilane, acryloxy-propyl methyl-dimethoxysilane, 3-acryloxypropyl-methylbis(trimethylsiloxy)silane, 3-acryloxypropyl-dimethylmethoxysilane, N-(3-acryloxy-2-hydroxypropyl)-3-aminopropyl-triethoxysilane.

Examples of methacrylic silanes are 3-methacryloxypropyltris (vinyldimethoxylsiloxy)silane, 3-methacryloxypropyltris(trimethylsiloxy) silane, 3-methacryloxypropyltris (methoxyethoxy)silane, 3-methacryloxy-propyl-trimethoxysilane, 3-methacryloxypropyl-pentamethyldisiloxane, 3-methacryloxy-propyl-methyldimethoxysilane, 3-methacryloxy-propyl methyl-diethoxysilane, 3-methacryloxypropyl-dimethyl-methoxysilane, 3-methacryloxy-propyl-dimethylethoxysilane, 3-methacryloxy-propenyl-trimethoxy-silane and 3-methacryloxy-propyl bis (trimethylsiloxy)methylsilane.

The preferred silane is acryloxypropyl-trimethoxysilane.

Preferably, the amounts of epoxyalkoxysilane(s) and unsaturated alkoxysilane(s) used for the coupling agent preparation are such that the weight ratio:

$$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight. The coupling agent preferably comprises less than 40% by weight of liquid water and/or organic solvent, more preferably less than 35% by weight.

The expression "weight of solid material from epoxyalkoxy silanes and unsaturated alkoxysilanes" means the theoretical dry extract from those silanes which is the calculated weight of unit $Q_k \text{Si} O_{(4-k)/2}$ where Q is the organic group that bears the epoxy or unsaturated group and $Q_k \text{Si} O_{(4-k)/2}$ comes from $Q_k \text{Si} R'O_{(4-k)}$ where Si—R' reacts to form Si—OH on hydrolysis.

k is an integer from 1 to 3 and is preferably equal to 1.

R' is preferably an alkoxy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprise:

1) mixing the alkoxysilanes
2) hydrolyzing the alkoxysilanes, preferably by addition of an acid, such a hydrochloric acid
3) stirring the mixture
4) optionally adding an organic solvent
5) adding one or several catalyst(s) such as aluminum acetylacetonate
6) Stirring (typical duration: overnight).

Typically, the amount of coupling agent introduced in the scratch-resistant coating composition represents 0.1 to 15% by weight of the total composition weight, preferably 1 to 10% by weight.

The abrasion- and/or scratch-resistant coating composition can be applied onto the impact-resistant primer coating using any classical method such as spin, dip or flow coating.

The abrasion- and/or scratch-resistant coating composition can be simply dried or optionally pre-cured before application of a subsequent anti-reflection coating. Depending upon the nature of the abrasion- and/or scratch-resistant coating composition, thermal curing, UV-curing or a combination of both can be used.

Thickness of the abrasion- and/or scratch-resistant coating, after curing, usually ranges from 1 to 15 µm, preferably from 2 to 6 µm, preferably from 3 to 5 microns.

If an anti-reflection coating is applied onto the abrasion-and/or scratch-resistant coating, it is possible to subject the surface of the scratch-resistant coating to a corona treatment or a vacuum plasma treatment, in order to increase adhesion.

Anti-reflection coatings and their methods of making are well known in the art. The anti-reflection can be any layer or stack of layers which improves the anti-reflective properties of the finished optical article. The anti-reflection coating may be a mono- or multilayered anti-reflection coating, and preferably consists of a mono- or multilayered film of dielectric materials such as SiO, $SiO_2$ $Si_3N_4$, $TiO_2$, $ZrO_2$, $Al_2O_3$, $MgF_2$ or $Ta_2O_5$, or mixtures thereof.

The anti-reflection coating can be applied in particular by vacuum deposition according to one of the following techniques:
1)—by evaporation, optionally ion beam-assisted;
2)—by spraying using an ion beam,
3)—by cathode sputtering; or
4)—by plasma-assisted vapor-phase chemical deposition.

The anti-reflection coating can also be applied by applying liquid solutions, preferably by a spin coating process.

In case where the anti-reflection coating includes a single layer, its optical thickness must be equal to $\lambda/4$, where $\lambda$ is a wavelength of 450 to 650 nm. Preferably, the anti-reflection coating is a multilayer film comprising three or more dielectric material layers of alternatively high and low refractive indexes.

A preferred anti-reflection coating may comprises a stack of four layers formed by vacuum deposition, for example a first $SiO_2$ layer having an optical thickness of about 100 to 160 nm, a second $ZrO_2$ layer having an optical thickness of about 120 to 190 nm, a third $SiO_2$ layer having an optical thickness of about 20 to 40 nm and a fourth $ZrO_2$ layer having an optical thickness of about 35 to 75 nm.

In accordance with the process of the invention, the outermost layer of the optical article which will be coated with the anti-fouling coating has to be treated beforehand with energetic species for a certain amount of time, resulting in surface physical attack and/or chemical modification. The liquid coating material to be deposited onto the outermost layer of the optical article also has to be treated with energetic species prior to the vacuum evaporation step, according to the same or a different energetic treatment.

By energetic species, it is meant species with an energy ranging from 1 to 150 eV, preferably from 10 to 150 eV, and more preferably from 40 to 150 eV. Energetic species may be chemical species such as ions, radicals, or species such as photons or electrons.

Treatment with energetic species of the optical article's outermost layer and/or of the liquid coating solution can be performed at any pressure, under vacuum or at atmospheric pressure. When it is performed under vacuum, the pressure is generally lower than 70 Pa, preferably lower than 40 Pa, albeit a pressure higher than 10 Pa is preferred.

To avoid excessive handling of materials, the coating material to be deposited in accordance with the invention and the outermost layer of the optical article to be coated may undergo simultaneously the same treatment with energetic species, which means they are treated in the same vacuum chamber at the same pressure. Indeed, presence of the coating material in the vacuum chamber does not interfere with the optical article surface treatment.

The present energetic treatments are first intended to improve the adhesion properties ("boundability") between the anti-fouling top coat and the outermost layer of the optical article. Good adhesion generally requires strong interfacial forces via chemical compatibility and/or chemical bonding. Treatments such as plasma can also assist in creating chemically active functional groups such as amine, carbonyl, hydroxyl and carboxyl groups, to improve interfacial adhesion. For instance, using an oxygen gas plasma may create hydroxyl functionality, thus increasing the wettability of a surface.

Herein, it is believed that treatment with energetic species activates the surface of the outermost layer of the optical article by altering the chemistry of a few outermost molecular layers.

Not to be bound by theory, it is envisioned by the inventors that the liquid coating material also undergoes chemical modifications during the energetic treatment, and is thus rendered prone to adhere to the outermost layer of the optical article. However, energetic treatment should be chosen so as to not severely alter properties of the liquid coating material to be deposited, for example the hydrophobic and/or oleophobic properties.

The present energetic treatments are also used to control surface energy of the outermost layer of the optical article. It is preferred that the energetic treatment of the invention imparts to the outermost layer of the optical article a surface energy of at least 60 $mJ/m^2$, preferably at least 72 $mJ/m^2$. The treatment time, which depends on the nature of the optical article, may be varied so as to reach such surface energy.

The energetic treatments in accordance with the present invention may also perform a surface cleaning, which is a safe and environmentally friendly alternative to traditional cleaning methods. For example, gas plasma treatments may remove organic surface contamination from the materials used. The active energetic species create chemical reactions with the contaminants, resulting in their volatilization and removal from the vacuum chamber.

Finally, if the treated surface is of polymer type, the present energetic treatments may create a higher cross-linking density within the material to depths of a few thousand angstroms. Surface cross-linking may enhance certain performances, such as hardness and chemical resistance.

Examples of treatments with energetic species are, without limitation: a vacuum plasma treatment, an atmospheric pressure plasma treatment, a glow discharge plasma treatment, a corona discharge treatment, an ion beam bombardment, in particular with an ion gun (especially with rare gases, oxygen, nitrogen, air or mixtures thereof), or an electron beam bombardment.

According to the invention, the preferred treatment with energetic species is a plasma treatment, more preferably a vacuum plasma treatment. Plasma can be defined as a partially (low temperature plasma) or wholly (high temperature plasma) ionized gas with a roughly equal number of positively and negatively charged particles.

Plasma can be generated by submitting a gas to a high voltage or high temperature arc (discharge). The source of the electric energy, which will energize the gas and ionize atoms and molecules, can be a DC or an AC current, radio frequency, or microwaves. The sources are connected to electrodes where the samples are set between.

The energetic species in gas plasma include ions, electrons, radicals, metastables, and photons in the short-wave ultraviolet (UV) range. Materials in contact with the gas plasma are bombarded by these energetic species and their energy is transferred from the plasma to those materials. These energy transfers are dissipated within the materials by a variety of chemical and physical processes (functionalization, grafting, etching, cross-linking . . . ) to result in a unique type of modification. In case of surface treatment, the bulk properties of the material are not altered.

A wide variety of processing parameters can be varied to affect the physical characteristics of the plasma used herein, and subsequently affect the surface chemistry obtained by plasma modification. Those parameters are, for example, treatment power, treatment time and operating pressure. This broad range of parameters offers greater control over the plasma process than that offered by most high-energy radiation processes.

Practically, the treatment time and treatment power required to successfully implement the process of the invention can be easily determined by the person skilled in the art.

When both the outermost layer of the optical article and liquid coating solution for the anti-fouling top coat have been energetically treated and put together in a vacuum chamber equipped with an evaporation device, the vacuum evaporation step can be implemented.

The anti-fouling top coat used herein is intended to improve dirty mark resistance of the finished optical article and in particular of the abrasion- and/or scratch-resistant coating or the anti-reflection coating.

As known in the art, an anti-fouling top coat is a layer wherein the stationary contact angle to deionized water is at least 750, preferably at least 90°, and more preferably more than 1000. The stationary contact angle is determined according to the liquid drop method in which a water drop having a diameter smaller than 2 mm is formed on the optical article and the contact angle is measured. It corresponds to the angle at which the surface of the water drop meets the surface of the optical article.

The anti-fouling top coats preferably used in this invention are those which reduce surface energy of the optical article to less than 14 mJ/m$^2$. The invention has a particular interest when using anti-fouling top coats having a surface energy of less than 13 mJ/m$^2$ and even better less than 12 mJ/m$^2$.

The surface energy values referred above are calculated according to Owens Wendt method described in the following document: Owens, D. K.; Wendt, R. G. "Estimation of the surface force energy of polymers", *J. Appl. Polym. Sci.* 1969, 51, 1741-1747.

The anti-fouling top coat according to the invention is preferably of organic nature. By organic nature, it is meant a layer which is comprised of at least 40% by weight, preferably at least 50% by weight of organic materials, relative to the total weight of the coating layer.

A preferred anti-fouling top coat is a hydrophobic and/or oleophobic surface coating, and more preferably an anti-fouling top coat made from a liquid coating material comprising at least one fluorinated compound.

Hydrophobic and/or oleophobic surface coatings most often comprise silane-based compounds bearing fluorinated groups, in particular perfluorocarbon or perfluoropolyether group(s). By way of example, silazane, polysilazane or silicone compounds are to be mentioned, comprising one or more fluorine-containing groups such as those mentioned here above. Such compounds have been widely disclosed in the previous art, for example in U.S. Pat. No. 4,410,563, EP 0203730, EP 749021, EP 844265 and EP 933377.

A known method to form an anti-fouling top coat consists in depositing, on the anti-reflection coating, compounds bearing fluorinated groups and Si—R groups, R representing an —OH group or a precursor thereof, such as —Cl, —NH$_2$, —NH— or —O-alkyl, preferably an alkoxy group. Such compounds may perform, at the anti-reflection coating surface, directly or after hydrolysis, polymerization and/or cross-linking reactions with pendent reactive groups.

Preferred fluorinated compounds are silanes and silazanes bearing at least one group selected from fluorinated hydrocarbons, perfluorocarbons, fluorinated polyethers such as $F_3C-(OC_3F_6)_{24}-O-(CF_2)_2-(CH_2)_2-O-CH_2-Si(OCH_3)_3$ and perfluoropolyethers, in particular perfluoropolyethers.

Among fluorosilanes there may be cited the compounds of formulae:

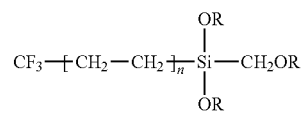

wherein n=5, 7, 9 or 11 and R is an alkyl group, typically a $C_1$-$C_{10}$ alkyl group such as methyl, ethyl and propyl;

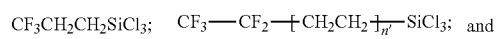

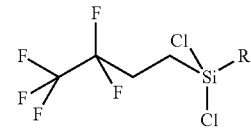

wherein n'=7 or 9 and R is as defined above.

Compositions containing fluorinated compounds also useful for making hydrophobic and/or oleophobic top coats are disclosed in U.S. Pat. No. 6,183,872. The silicon-containing organic fluoropolymer of U.S. Pat. No. 6,183,872 is represented by the below general formula and has a number average molecular weight of from $5 \times 10^2$ to $1 \times 10^5$.

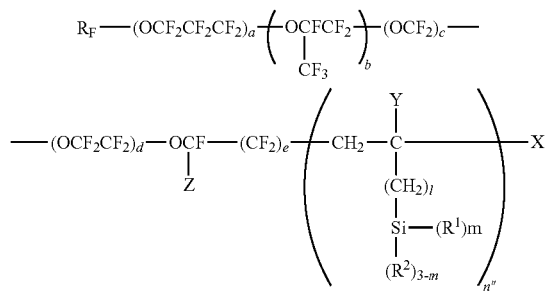

wherein $R_F$ represents a perfluoroalkyl group, Z represents a fluorine atom or a trifluoromethyl group, a, b, c, d and e each independently represent 0 or an integer equal to or higher than 1, provided that a+b+c+d+e is not less than 1 and the order of the repeating units parenthesized by subscripts a, b, c, d and e occurring in the above formula is not limited to that shown; Y represents a hydrogen atom or an alkyl group containing 1 to 4 carbon atoms; X represents a hydrogen, bromine or iodine atom; $R^1$ represents a hydroxyl group or a hydrolyzable substituent group; $R^2$ represents a hydrogen atom or a monovalent hydrocarbon group; l represents 0, 1 or 2; m represents 1, 2 or 3; and n" represents an integer equal to or higher than 1, preferably equal to or higher than 2.

Other preferred compositions for forming the hydrophobic and/or oleophobic surface coating are those containing compounds comprising fluorinated polyether groups, in particular perfluoropolyether groups. A particular preferred class of compositions containing fluorinated polyether groups is disclosed in U.S. Pat. No. 6,277,485. The anti-fouling top coats of U.S. Pat. No. 6,277,485 are at least partially cured coatings comprising a fluorinated siloxane prepared by applying a coating composition (typically in the form of a solution) comprising at least one fluorinated silane of the following formula:

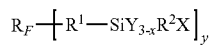

wherein $R_F$ is a monovalent or divalent fluorinated polyether group, $R^1$ is a divalent alkylene group, arylene group, or combinations thereof, optionally containing one or more heteroatoms or functional groups and optionally substituted with halide atoms, and preferably containing 2 to 16 carbon atoms $R^2$ is a lower alkyl group (i.e., a $C_1$-$C_4$ alkyl group); Y is a halide atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R_F$ is monovalent) or 2 ($R_F$ is divalent). Suitable compounds typically have a molecular weight (number average) of at least about 1000. Preferably, Y is a lower alkoxy group and $R_F$ is a fluorinated polyether group.

Commercial compositions for making anti-fouling top coats are the compositions KY130 and KP 801M commercialized by Shin-Etsu Chemical and the composition OPTOOL DSX (a fluorine-based resin comprising perfluoropropylene moieties) commercialized by Daikin Industries. OPTOOL DSX is the most preferred coating material for anti-fouling top coats.

The liquid coating material for forming the anti-fouling top coat of the invention, generally referred to as "the liquid coating material", may comprise one or more of the above cited compounds. Preferably, such compounds or mixtures of compounds are liquid or can be rendered liquid by heating, thus being in a suitable state for evaporation. Such liquid coating material is applied onto the outermost layer of the optical article in vapor phase by means of an evaporation device.

Using the vacuum deposition method is advantageous, since anti-reflection layers have generally been deposited by evaporation in vacuum chambers and it is desirable to deposit the anti-fouling layer with the same method, making it possible to perform all the operations successively, with no excessive handling of the lenses between the steps.

Various evaporation devices can be used in accordance with the process of the invention, such as devices based on ion or electron beam heating methods, devices based on high-frequency heating method, devices based on optical heating method (for example such device comprising a tungsten lamp), a Joule effect device or resistance heating device, and more generally any heating device which provides sufficient heat to evaporate the liquid coating material. Those devices are well known in the art. In a preferred embodiment, the evaporation device is an electron gun or a Joule effect device, most preferably a Joule effect device.

In one embodiment of the invention, said Joule effect device comprises an electrical circuit connected to a piece of steel wool onto which the liquid coating material for the anti-fouling top coat is deposited. When an electrical current (an alternating current or a direct current) goes through the steel wool, the liquid coating material is evaporated. The power and the time required to evaporate the liquid coating material depend on the nature of the coating material used. In the case when a piece of steel wool is employed, the power and the time required also depend on nature of the piece of steel wool.

In another embodiment of the invention, the liquid coating material is poured in a capsule such as a copper capsule, in turn placed in a joule effect carrier such as a tantalum or molybdenum crucible, which can be heated at a temperature around 400° C. to allow evaporation. Alternatively, the liquid coating material can be heated through an electron beam directed towards the carrier.

The evaporation has to be started after treatment of the outermost layer of the optical article with energetic species and after the liquid coating material has been treated with energetic species. If vacuum evaporation and treatment with energetic species of said outermost layer and said liquid coating material are started at the same time in the same vacuum chamber, adhesion problems can be encountered.

If the liquid coating solution is vacuum evaporated without having been previously treated with energetic species, adhesion problems can be encountered, especially if the evaporation is performed under a pressure higher than 10 Pa.

When both energetic treatments are performed in the same vacuum chamber, the evaporation step may be started immediately after having achieved such treatments. In a preferred embodiment, no treatment with energetic species is performed during the vacuum evaporation step, which means that such treatment is stopped once achieved, for example once a satisfactory surface energy is obtained, and then the evaporation can be started. However, treatment with energetic species of the outermost layer of the optical article and/or of the liquid coating solution can be continued during the whole vacuum evaporation step or only part of it, without altering the deposition process.

It is also possible to apply additional energetic treatments during the vacuum evaporation step. Reference may be made to an ion bombardment directed toward the surface of the optical article, so as to improve the mechanical properties and in particular to compact the layer being deposited. Such a process is conventional and known as "ion-assisted deposition" or IAD.

Vacuum evaporation is generally performed herein under a pressure lower than 70 Pa, preferably lower than 40 Pa and more preferably lower than 30 Pa. In one embodiment of the invention, evaporation is performed under a pressure higher than 10 Pa, which does not lead to adhesion troubles. This means that the pressure requirements of the inventive process are particularly little restricting as compared to the pressure requirements of the prior art processes. As a consequence, vacuum chambers which are not capable of providing an advanced vacuum may now be used for such anti-fouling coating process. Obviously, the process in accordance with the invention can also be performed at a lower pressure, for instance under a pressure ranging from $10^{-3}$ to $10^{-1}$ Pa. The working pressure may be as low as is technically permitted by the vacuum chamber employed.

The process of the invention is made easier if the same pressure is employed during the energetic treatments and vacuum evaporation steps.

Practically, since energetic treatments need not to be conducted under vacuum while this feature is a requirement for the evaporation step, vacuum has to be drawn in the vacuum chamber preferably at the end of the energetic treatments so that the evaporation can be started, unless the energetic treatments were performed under a vacuum suitable for the subsequent evaporation step, which can then be performed without pressure modification.

It is worth noting that when the energetic treatments are performed under vacuum, vacuum can be released and the vacuum chamber can be opened at the end of such treatments for a certain amount of time before implementing the vacuum evaporation step, with no consequence on adhesion of the anti-fouling top coat. As a consequence, energetic treatments of the surface of the optical article and of the liquid coating material need not to be performed simultaneously in the same vacuum chamber.

The evaporation step of the liquid coating material results in the deposition of the evaporated coating material onto the treated outermost layer of the optical article. When the desired thickness is reached, the evaporation of the coating material is ceased. Generally, the anti-fouling surface coating thus obtained has a physical thickness lower than 30 nm, preferably ranging from 1 to 20 nm, more preferably ranging from 1 to 10 nm, and even better from 1 to 5 nm. Control of the deposited thickness can be performed by means of a quartz scale.

As previously indicated, the optical articles which may be treated with the method according to the invention have two main faces, at least one of which being coated with an outermost layer. The process of the invention is preferably used for manufacturing ophthalmic lenses coated on their concave side (back side). If desired, coating may also be made on the convex main surface of the lens only, or on both sides.

The lenses to be treated according to the process of the invention are lens blanks, which may be semi-finished lenses or finished lenses. A finished lens is a lens obtained in its definitive shape, having both of its main faces surfaced or cast to the required geometry. A semi-finished lens is a lens which comprises, after molding, only one of its main faces surfaced or cast to the required geometry, and wherein preferably one face of the lens, preferably the front face of the lens, has previously been treated with an appropriate coating (anti-reflection, hard coat, impact resistant primer coating, etc. . . . ). Its second face, preferably the rear face, has then to be coated and surface-finished as required. The lens blank can also be a polarized lens or a photochromic lens.

Successful implementation of the inventive process can be easily checked, for example by measuring contact angles on finished optical articles, which value has to be as defined above. Contact angle should not decrease after submitting finished optical article to a hydrolytic treatment.

As a result of depositing the anti-fouling layer of the invention onto the outermost layer of the optical article, a finished optical article is obtained, having two main faces, at least one of which, comprising a coating layer coated with a top coat having anti-fouling properties and adhering to the surface of said coating layer. In a preferred embodiment, both main faces of the optical article are coated with an anti-fouling top coat.

The process of the invention may be performed in a vacuum treating machine, as described hereafter:

The pump of such machine is a normal pump, used in rough vacuum. The pump is from Hanning Elektro-werke. It is model VDE 0530. Those pumps are used when rough vacuum is needed.

The process of the invention may be implemented by using the above described machine as follows.

The plasma chamber is a cylinder where the front of the cylinder is the opening and the back is where the vacuum is pulled. The lenses are placed flat in the chamber. The treatment is done on both sides at the same time. The anti-fouling coating is placed on the front of the cylinder.

Now, the present invention will be described in more detail with reference to the following examples. These examples are provided only for illustrating the present invention and should not be construed as limiting the scope and spirit of the present invention.

EXAMPLES

Preparation of Lenses with an Anti-Abrasion Outermost Layer

Organic glass lenses were prepared bearing an anti-abrasion coating.

The deposits were achieved on substrates which are polycarbonate ophthalmic lenses power: −2.00, round 65 mm diameter lenses, comprising, on both sides, an anti-abrasion coating. The lenses were production lenses sold under the name of Airwear™.

The vacuum treating machine used was the PDG-32G from Harrick Plasma with a VDE 0530 pump from Hanning Elektro-Werke. The evaporation device of this machine was composed of an elongated piece of steel wool connected on both sides to an electrical circuit.

Example 1

This experiment aims at evaluating the plasma power and treatment time required to treat an anti-fouling liquid coating material so as to successfully deposit an anti-fouling top coat onto the anti-abrasion coating of an already energetically treated ophthalmic lens.

The treatment with energetic species was a vacuum plasma treatment. The plasma used was a Plasma cleaners PDC-32G. A current of 1.2 A was used for evaporation (treatment time: 5 min).

The anti-fouling liquid coating material was an OPTOOL DSX coating solution, sold by DAIKIN Industries.

The contact angles were measured on finished optical articles according to the liquid drop method by having deposited a droplet of distilled water with a diameter smaller than 2 mm onto the coated surface of said optical article.

The lens as defined above was set in the vacuum chamber containing the evaporation device with no OPTOOL DSX deposited on the piece of steel wool. The chamber was closed and the vacuum was pulled (200 mTorr, ≈27 Pa). The plasma treatment of the lens started when the correct pressure was attained. At the end of the treatment time (20 s, 720 V DC, 25 mA DC, 18 W), the plasma was stopped, the vacuum was released and the vacuum chamber was opened.

1 mL of OPTOOL DSX was then deposited onto the piece of steel wool contained in the evaporation device. Then the vacuum was pulled again (200 mTorr, ≈27 Pa) and the plasma treatment was started again with a low, medium or high power (see the below table) for 10, 20 or 30 seconds.

The three following plasma powers were evaluated:

| Low power | 680 V DC | 10 mA DC | 6.8 W |
| --- | --- | --- | --- |
| Medium power | 700 V DC | 15 mA DC | 10.5 W |
| High power | 720 V DC | 25 mA DC | 18 W |

Then the plasma was stopped and the vacuum evaporation was started by turning on the current for 5 minutes. The current was stopped and the vacuum was released.

The contact angles measured on the finished optical articles are summarized in the following table:

| Treatment time of the liquid coating material (s) | Contact angle with deionized water | | |
| --- | --- | --- | --- |
| | Low power | Medium power | High power |
| 10 | 59.19° | 98.92° | 103.75° |
| 20 | 56.12° | 100.20° | 104.95° |
| 30 | 97.18° | 100.85° | 100.99° |

The better results were obtained with a treatment time of 20 seconds and a high plasma power (18 W, 720 V DC, 25 mA DC). Such settings were used in examples 2-6.

Examples 2-6

The treatment with energetic species was a vacuum plasma treatment, which allowed to simultaneously treating the outermost layer of the optical article and the liquid coating material. The plasma used was a Plasma cleaners PDC-32G with a plasma power of 18 W (720 V DC, 25 mA DC) and a treatment time of 20 seconds.

A current of 1.2 A was used for evaporation (treatment time: 5 min).

The liquid coating material was an OPTOOL DSX coating solution, sold by DAIKIN Industries or a KP 801M coating solution, commercialized by Shin-Etsu Chemical.

Example 2

A lens with the abrasion-resistant coating as described above was set in the vacuum chamber containing the evaporation device with 1 mL of OPTOOL DSX deposited on the piece of steel wool. The chamber was closed and the vacuum was pulled (200 mTorr, ≈27 Pa). The plasma treatment started when the correct pressure was attained. The surface of the abrasion-resistant coating and the piece of steel wool, on which the OPTOOL DSX is deposited are simultaneously submitted to the plasma treatment. At the end of the treatment time (20 s after the start of the plasma in the chamber), the plasma power was turned off and the vacuum evaporation and deposition of OPTOOL DSX onto the surface of the abrasion-resistant coating was started by turning on the current for 5 minutes. The current was stopped and the vacuum was released.

Example 3

The same procedure as in example 2 was performed except that the current of the evaporation device was not turned on. Instead, the vacuum was left on for 5 minutes.

Example 4

The same procedure as in example 2 was performed except that after the plasma was stopped, the vacuum was released and the vacuum chamber was opened. The vacuum was then pulled again (200 mTorr, ≈27 Pa) and the evaporation was conducted as in example 2.

Example 5

A lens (prepared as described above) was set in the vacuum chamber containing the evaporation device with no OPTOOL DSX deposited on the piece of steel wool. The chamber was closed and the vacuum was pulled (200 mTorr, ≈27 Pa). The plasma treatment started when the correct pressure was attained. At the end of the treatment time (20 s after the start of the plasma in the chamber), the plasma power was turned off, the vacuum was released and the vacuum chamber was opened. 1 mL of OPTOOL DSX was deposited onto the piece of steel wool contained in the evaporation device. Then the vacuum was pulled again (200 mTorr, ≈27 Pa) and evaporation was started by turning on the current for 5 minutes. The current was stopped and the vacuum was released.

Example 6

The same procedure as in example 2 was performed with KP 801M in place of OPTOOL DSX.

The contact angles measured on optical articles prepared according to procedures of examples 2-6 are given in the below table:

| | Example 2 | Example 3 (comparative) | Example 4 | Example 5 (comparative) | Example 6 |
| --- | --- | --- | --- | --- | --- |
| Contact angle with deionized water | 105° | 39° | 103° | 50° | 95° |

Examples 2, 4 and 6 are examples of coating processes according to the invention. The contact angles obtained reveal that deposition of the anti-fouling top coat onto the outermost surface of the optical article has been successful. The resulting lenses showed excellent cleanability properties when dirty.

As expected, example 3 reveals that the electrical current is needed to proceed to evaporation. Example 4 shows that opening the plasma chamber at the end of the plasma treatment has no effect on the subsequent vacuum evaporation step, since adhesion of the anti-fouling top coat is still obtained. In light of example 4, example 5 shows that if the energetic treatment of the liquid coating material is omitted, the deposition of the anti-fouling top coat is not successful.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A process for depositing an anti-fouling top coat onto an outermost layer of an optical article, comprising the steps of:
   a) in an evacuatable vacuum chamber, providing both the optical article having two main faces, at least one of which being coated with the outermost layer, and a liquid antifouling coating material; then
   b) performing an activation treatment of said outermost layer with energetic species, which are chemical species or electrons, having an energy ranging from 1 to 150 eV resulting in surface physical attack and/or chemical modification of said outermost layer; and then c) evaporating under vacuum the liquid anti-fouling coating material with an evaporation device, resulting in deposition of the evaporated coating material onto the outermost layer of the optical article and in formation of the anti-fouling top coat, wherein prior to c), said liquid anti-fouling coating material and said outermost layer of the optical article are subjected in the same vacuum chamber to said activation treatment, which is selected from at least one of vacuum plasma treatment, atmospheric pressure plasma treatment, glow discharge plasma treatment, and corona discharge treatment.

2. The process of claim 1, wherein said liquid coating material and said outermost layer of the optical article are simultaneously subjected in the same vacuum chamber to said activation treatment.

3. The process of claim 1, wherein said outermost layer of the optical article is an abrasion- and/or scratch-resistant coating.

4. The process of claim 1, wherein said outermost layer of the optical article is a mono- or multilayered anti-reflection coating.

5. The process of claim 1, wherein the deposited anti-fouling top coat is a hydrophobic and/or oleophobic surface coating.

6. The process of claim 1, wherein the deposited anti-fouling top coat is made from a liquid coating material comprising at least one fluorinated compound.

7. The process of claim 6, wherein the deposited anti-fouling top coat comprises a fluorine-based resin comprising perfluoropropylene moieties.

8. The process of claim 1, wherein the liquid coating material comprises one or more silane bearing at least one fluorinated hydrocarbon, perfluorocarbon, fluorinated polyether or perfluoropolyether or silazane bearing at least one fluorinated hydrocarbon, perfluorocarbon, fluorinated polyether or perfluoropolyether.

9. The process of claim 1, wherein the deposited anti-fouling top coat imparts to the optical article a surface energy of less than 14 mJ/m$^2$.

10. The process of claim 9, wherein the deposited anti-fouling top coat imparts to the optical article a surface energy of less than 12 mJ/m$^2$.

11. The process of claim 1, wherein the deposited anti-fouling top coat has a physical thickness lower than 30 nm.

12. The process of claim 11, wherein the deposited anti-fouling top coat has a physical thickness ranging from 1 to 10 nm.

13. The process of claim 1, wherein the deposited anti-fouling top coat imparts to the optical article a stationary contact angle to deionized water of more than 100°.

14. The process of claim 1, wherein the activation treatment of the outermost layer of the optical article with the energetic species imparts to the outermost layer of the optical article a surface energy of at least 60 mJ/m$^2$.

15. The process of claim 14, wherein the activation treatment of the outermost layer of the optical article with the energetic species imparts to the outermost layer of the optical article a surface energy of 72 mJ/m$^2$.

16. The process of claim 1, wherein the energetic species have an energy ranging from 10 to 150 eV.

17. The process of claim 16, wherein the energetic species have an energy ranging from 40 to 150 eV.

18. The process of claim 1, wherein the activation treatment with the energetic species of the outermost layer of the optical article is performed under vacuum under a pressure lower than 40 Pa.

19. The process of claim 1, wherein the activation treatment with the energetic species of the outermost layer of the optical article is performed at atmospheric pressure.

20. The process of claim 1, wherein the activation treatment with the energetic species of the outermost layer of the optical article is performed under a pressure higher than 10 Pa.

21. The process of claim 1, wherein the activation treatment of said outermost layer is a vacuum plasma treatment, an atmospheric pressure plasma treatment, a glow discharge plasma treatment, a corona discharge treatment, an ion beam bombardment or an electron beam bombardment.

22. The process of claim 1, wherein the activation treatment with the energetic species of the outermost layer of the optical article is a plasma treatment.

23. The process of claim 1, wherein the evaporation device is a device based on ion or electron beam heating methods, a device based on high-frequency heating method, a device based on optical heating method, or a Joule effect device.

24. The process of claim 1, wherein the evaporation device is a Joule effect device comprising an electrical circuit connected to a piece of steel wool onto which is deposited the liquid coating material for the evaporating and the formation of the anti-fouling topcoat.

25. The process of claim 1, wherein the evaporation device is an electron gun.

26. The process of claim 1, wherein the vacuum evaporation step is performed under a pressure lower than 70 Pa.

27. The process of claim 1, wherein the vacuum evaporation step is performed under a pressure higher than 10 Pa.

28. The process of claim 1, wherein the vacuum evaporation step and the activation treatment with the energetic species of the outermost layer of the optical article is performed under the same pressure.

29. The process of claim 1, wherein the activation treatment with the energetic species of the outermost layer of the optical article is continued during at least part of the evaporation under vacuum.

30. The process of claim 1, wherein no plasma treatment and no corona discharge treatment are performed during step c).

31. The process of claim 1, wherein the optical article is an ophthalmic lens.

32. The process of claim 1, wherein said vacuum plasma treatment, glow discharge plasma treatment, or corona discharge treatment is performed under vacuum under a pressure lower than 40 Pa.

33. The process of claim 1, wherein said atmospheric pressure plasma treatment, glow discharge plasma treatment, or corona discharge treatment is performed at atmospheric pressure.

34. The process of claim 1, wherein said vacuum plasma treatment, atmospheric pressure plasma treatment, glow discharge plasma treatment, or corona discharge treatment is performed under a pressure higher than 10 Pa.

35. The process of claim 1, wherein the liquid coating material has been subjected to said vacuum plasma treatment, atmospheric pressure plasma treatment, or glow discharge plasma treatment.

36. The process of claim 1, wherein the vacuum evaporation step and said vacuum plasma treatment, glow discharge plasma treatment, or corona discharge treatment is performed under the same pressure.

37. The process of claim 1, wherein said vacuum plasma treatment, glow discharge plasma treatment, or corona discharge treatment is performed during at least part of the evaporation under vacuum.

38. The process of claim 1, wherein said activation treatment is selected from at least one of vacuum plasma treatment, glow discharge plasma treatment, and corona discharge treatment.

\* \* \* \* \*

UNITED STATES PATENT AND TRADEMARK OFFICE
CERTIFICATE OF CORRECTION

| | | |
|---|---|---|
| PATENT NO. | : 8,945,684 B2 | Page 1 of 1 |
| APPLICATION NO. | : 11/267954 | |
| DATED | : February 3, 2015 | |
| INVENTOR(S) | : Gérald Fournand | |

It is certified that error appears in the above-identified patent and that said Letters Patent is hereby corrected as shown below:

In the Specification

Column 10, line 14;

Delete "hydrocarcarbons" and replace with -- hydrocarbons --.

In the Claims

Claim 8, Column 17, Line 40;

Delete "hydrocarcarbon" and replace with -- hydrocarbon --.

Signed and Sealed this
Seventh Day of July, 2015

Michelle K. Lee
*Director of the United States Patent and Trademark Office*